United States Patent
Landmark

(10) Patent No.: US 7,362,264 B2
(45) Date of Patent: Apr. 22, 2008

(54) INTERFERENCE MANAGEMENT

(75) Inventor: Joakim Landmark, Uppsala (SE)

(73) Assignee: Infineon Technologies AG, Neubiberg (DE)

( * ) Notice: Subject to any disclaimer, the term of this patent is extended or adjusted under 35 U.S.C. 154(b) by 180 days.

(21) Appl. No.: 11/314,724

(22) Filed: Dec. 22, 2005

(65) Prior Publication Data
US 2006/0145915 A1 Jul. 6, 2006

(30) Foreign Application Priority Data
Dec. 23, 2004 (EP) .................................. 04030698

(51) Int. Cl.
*G01S 5/14* (2006.01)
*H04B 1/00* (2006.01)
(52) U.S. Cl. .............................. 342/357.02; 342/357.1; 375/144
(58) Field of Classification Search .............. 342/357.1
See application file for complete search history.

(56) References Cited

U.S. PATENT DOCUMENTS

| | | | | |
|---|---|---|---|---|
| 5,301,368 A | * | 4/1994 | Hirata | 455/78 |
| 6,107,960 A | * | 8/2000 | Krasner | 342/357.09 |
| 6,442,375 B1 | * | 8/2002 | Parmentier | 455/78 |
| 6,448,925 B1 | * | 9/2002 | Shridhara | 342/357.02 |
| 6,587,078 B1 | | 7/2003 | Doty | |
| 6,681,181 B2 | * | 1/2004 | Fielder | 701/213 |
| 6,828,935 B1 | | 12/2004 | Dunn et al. | |
| 2004/0239559 A1 | * | 12/2004 | King et al. | 342/357.12 |
| 2006/0125688 A1 | * | 6/2006 | Henderson et al. | 342/379 |

\* cited by examiner

*Primary Examiner*—Gregory C Issing
(74) *Attorney, Agent, or Firm*—Edell, Shapiro & Finnan, LLC

(57) ABSTRACT

A GPS system is configured to manage interference from disturbing signals. The system includes an antenna, an RF front end unit, a filtering unit, amplifying circuits, a carrier recovery unit, a correlation unit, and a calculating unit that performs range calculations. A multiplying unit, which is positioned between the carrier recovery unit and the correlation unit, is adapted to multiply the signal from the carrier recovery unit to the correlation unit with either zeros, "0", or ones, "1", and a control logic unit is configured to control the multiplying unit into using zeros, "0", if interference is detected and into using ones, "1", if no interference is detected.

11 Claims, 3 Drawing Sheets

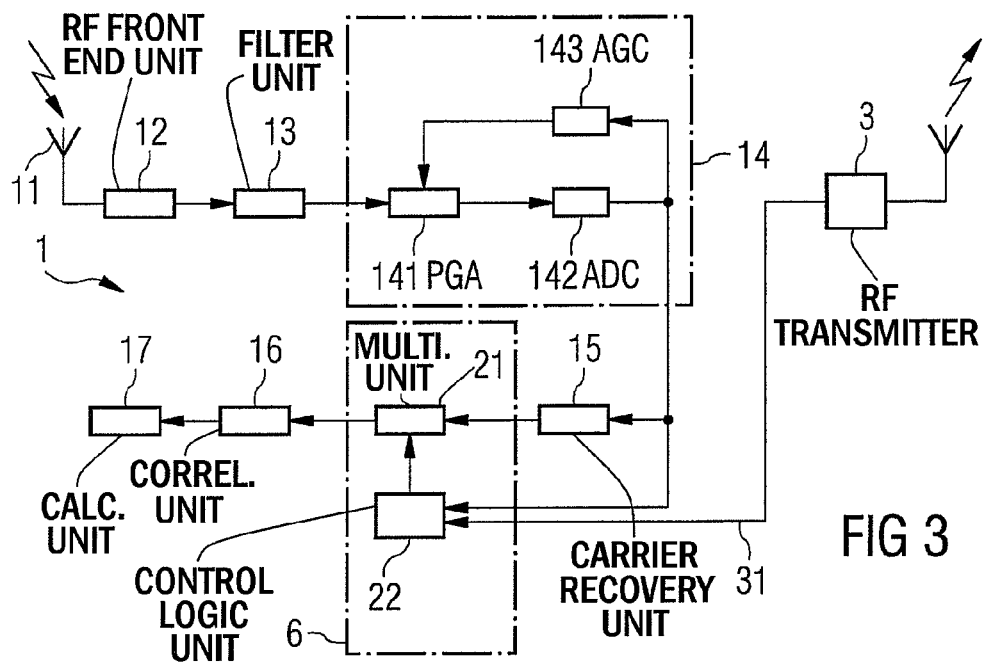
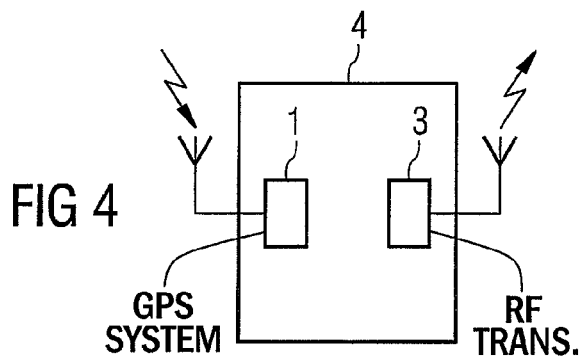
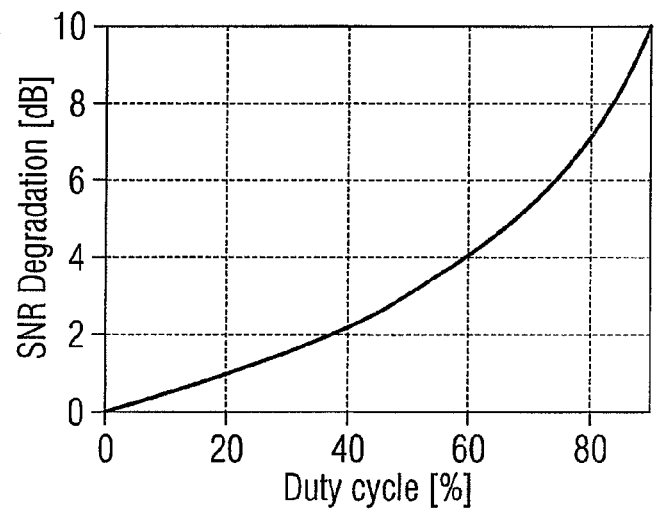

INTERFERENCE MANAGEMENT

CROSS REFERENCE TO RELATED APPLICATIONS

This application claims priority under 35 USC §119 to European Application No. EP 04030698.7, filed on Dec. 23, 2004, and titled "Interference Management," the entire contents of which are hereby incorporated by reference.

FIELD OF INVENTION

The present invention relates to a GPS system, adapted to manage interference from disturbing signals. The present invention also relates to a method for managing interference from disturbing signals in a GPS system and computer program products and a computer readable medium for a GPS system.

BACKGROUND

A Global Positioning System (GPS) receiver typically includes an antenna, an RF front end unit, a filtering unit, amplifying circuits, a carrier recovery unit, a correlation unit, and a calculating unit that performs range calculations.

It is known that a GPS receiver can be heavily disturbed for several reasons if interfered by an RF signal, such as a Global System for Mobile Communications (GSM) signal. The RF front end will be saturated, the GSM signal will go through the filters and corrupt the correlation and the GSM broadband phase noise will increase the noise floor in the receiver.

In units including both a GPS receiver and a GSM transmitter it is known to use a signal from the GSM transmitter to determine if the GSM transmitter is active. This is then used to disable the Automatic Gain Control (AGC) of the amplifying circuits in the GPS receiver during the GSM burst.

It is also known to provide a filtering unit in the GPS system with isolation that has been optimized for GSM signals.

SUMMARY

It is an object to be able to take appropriate measures when interference by a pulsed interferer, from GSM or other possible interferer, is detected in a GPS system.

It is also an object to detect interference by a pulsed interferer in order to be able to take appropriate measures during such interference.

It is a further object to solve the problem in which a filtering unit that is optimized to isolate GSM signals influences the GPS performance and increases the cost of the GPS system.

The aforesaid objects are achieved individually and/or in combination, and it is not intended that the present invention be construed as requiring two or more of the objects to be combined unless expressly required by the claims attached hereto.

In accordance with the present invention, a GPS system comprises an antenna, an RF front end unit, a filtering unit, amplifying circuits, a carrier recovery unit, a correlation unit, and a calculating unit that performs range calculations. In addition, a multiplying unit is positioned between the carrier recovery unit and the correlation unit. The multiplying unit is configured to multiply the signal from the carrier recovery unit to the correlation unit with either zeros, "0", or ones, "1." A control logic unit is configured to control the multiplying unit into using zeros, "0", if interference is detected and into using ones, "1", if no interference is detected.

In one embodiment, the amplifying circuits comprise a Programmable Gain Amplifier (PGA) configured to amplify a received signal from the filtering unit, an Analog to Digital Converter (ADC) configured to convert an amplified analog signal into a digital signal, and an Automatic Gain Control (AGC) configured to control the gain of the PGA according to the output from the ADC. To detect interference, the control logic unit is further configured to measure the duty cycle of the highest magnitude bit of the ADC, and the control logic unit is also further configured to interpret a sudden and significant change in the duty cycle of the highest magnitude bit as a detected interference where, after a return to the duty cycle prior to the change of the highest magnitude bit, is interpreted as no detected interference.

In another embodiment, the system is a part of, or co-acting with, an RF transmitter, and a transmit active (TX Active) signal, indicating when the transmitter is active, is available from the transmitter to the GPS system. To detect interference, the control logic unit is further configured to interpret the TX Active signal as a detected interference and no TX Active signal is interpreted as no detected interference.

This GPS system of the present invention is specifically advantageous where the GPS system and the RF transmitter are parts of a mobile device, such as a cellular phone, a personal digital assistant, or a mobile computer, such as a lap top, and if the RF transmitter is a GSM transmitter.

It should be understood that the term "system" in the present invention refers to the receiver part of a total GPS system. It is to be understood that the GPS system according to the invention may be a receiver part in a total GPS system.

The advantages of a system and method according to the present invention are primarily that disturbing interferences in a GPS system are easily managed. This can be done without expensive filtering techniques that will have a detrimental influence on the GPS performance.

The above and still further objects, features and advantages of the present invention will become apparent upon consideration of the following detailed description of specific embodiments thereof, particularly when taken in conjunction with the accompanying drawings, wherein like numerals designate like elements.

BRIEF DESCRIPTION OF THE DRAWINGS

FIG. 3 is a schematic of a GPS system the combines the first and second embodiments of FIGS. 1 and 2 in accordance with the present invention.

FIG. 4 is a schematic of a mobile device including both a GPS system and an RF transmitter in accordance with the present invention.

FIG. 5 is a graph showing the maximum degradation of SNR vs duty cycle of an interferer.

DETAILED DESCRIPTION

Figure 1:
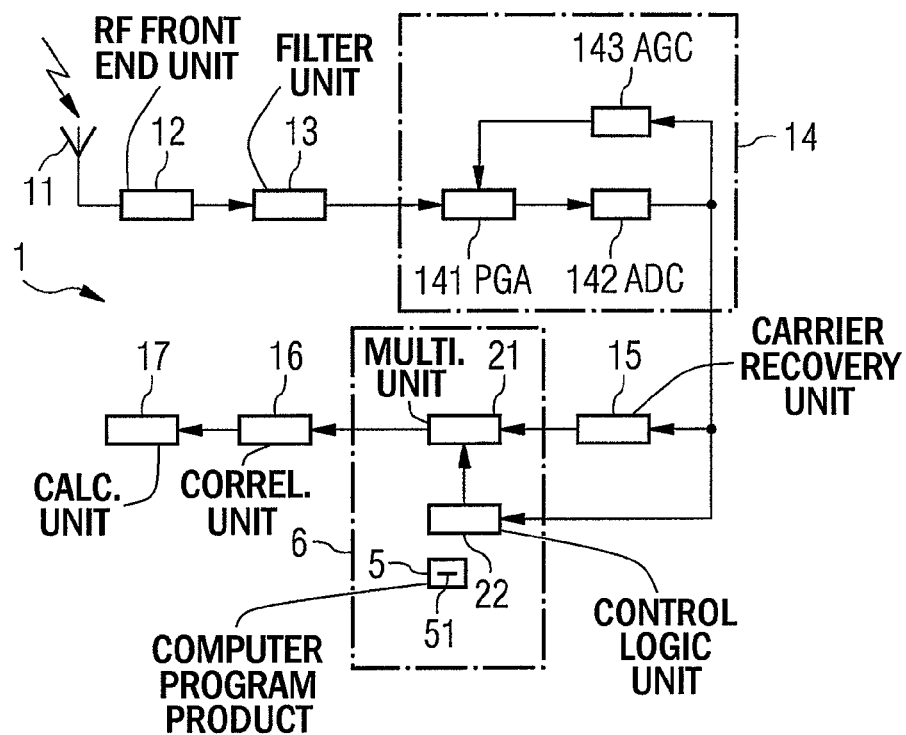
FIG. 1 is a schematic of a first embodiment of a GPS system according to the present invention.

The present invention will be described with reference to FIG. 1, showing a GPS system 1, adapted to manage interference from disturbing signals. The system includes an antenna 11, an RF front end unit 12, a filtering unit 13, amplifying circuits 14, a carrier recovery unit 15, a correlation unit 16, and a calculating unit 17 that performs range calculations.

A multiplying unit 21, positioned between the carrier recovery unit 15 and the correlation unit 16, is configured to multiply the signal from the carrier recovery unit 15 to the correlation unit 16 with either zeros, "0", or ones, "1". A control logic unit 22 is configured to control the multiplying unit 21 into using zeros, "0", if interference is detected and into using ones, "1", if no interference is detected.

Detection of interference may be performed in various ways in accordance with the present invention, and two exemplary embodiments will be described below.

In a system where the amplifying circuits 14 include a Programmable Gain Amplifier (PGA) 141 configured to amplify a received signal from the filtering unit 13, an Analog to Digital Converter (ADC) 142 configured to convert the amplified analog signal into a digital signal, and an Automatic Gain Control (AGC) 143 configured to control the gain of the PGA 141 according to the output from the ADC 142, the control logic unit 22 is configured to measure the duty cycle of the highest magnitude bit of the ADC 142, and the control logic unit 22 is further configured to interpret a sudden and significant change in the duty cycle of the highest magnitude bit as a detected interference, where after a return to the duty cycle prior to the change of the highest magnitude bit is interpreted as no detected interference. It should be understood that such a change might be either an increased duty cycle or a decreased duty cycle.

An example of this embodiment is a system where there is a 3 bit ADC 142 with one sign bit and two magnitude bits. The AGC 143 operates by measuring the duty cycle of the highest magnitude bit and controlling the gain in order to get a reasonable duty cycle. If a strong interferer, i.e. a GSM transmitter, is suddenly turned on there will be a sudden change in the duty cycle of the highest magnitude bit since the average voltage will be much higher. If the duty cycle significantly changes, this can be interpreted as interference.

Since the ADC 142 is located after the filtering unit 13, interference reaching the ADC 142 will not be filtered out and thus will reach the correlation unit 16.

An advantage with this embodiment is that any source of RF signals may be detected, that is both signals from the system itself and signals from entirely other systems.

By measuring the duty cycle of the highest magnitude bit of the ADC 142, it is possible to detect interference by any pulsed interferer.

Figure 2:
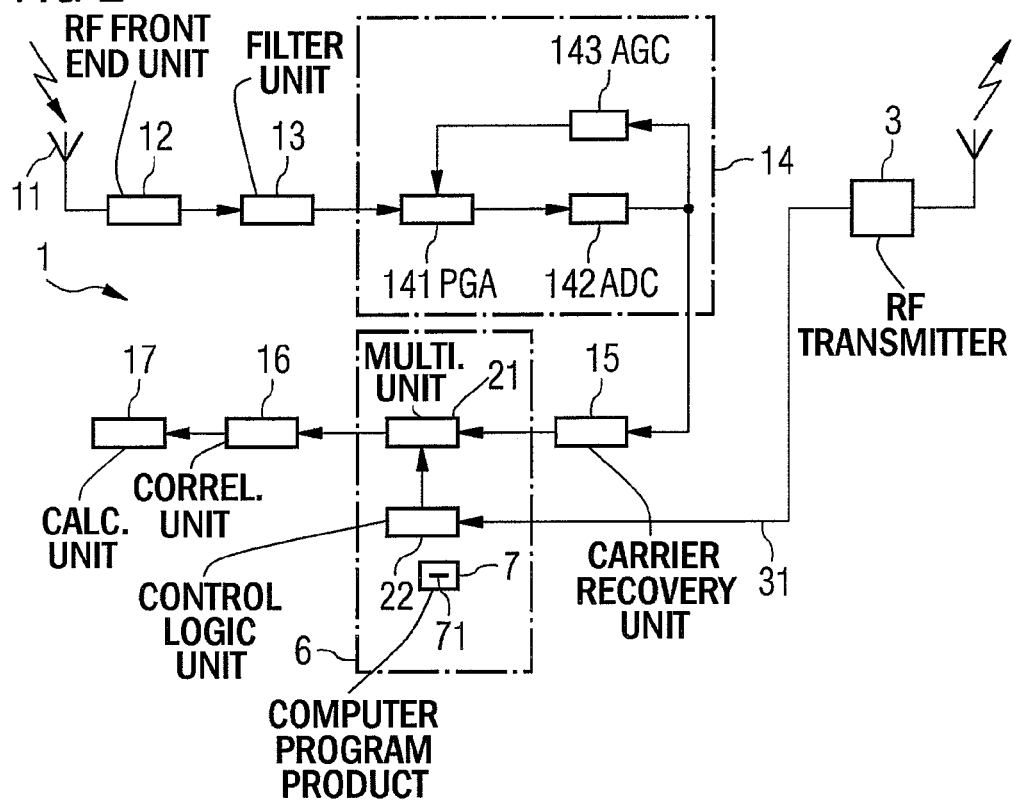
FIG. 2 is a schematic of a second embodiment of a GPS system according to the present invention.

FIG. 2 shows a second embodiment where the GSM system 1 is a part of, or is co-acting with, an RF transmitter 3. In such a system it is often possible to have a transmit active (TX Active) signal 31, indicating when the transmitter 3 is active, available from the transmitter 3 to the GPS system 1. In this embodiment, the control logic unit 22 is configured to interpret the TX Active signal 31 as a detected interference and that no TX Active signal 31 is interpreted as no detected interference.

A combination of the two embodiments described in FIGS. 1 and 2 is also possible, and FIG. 3 shows that the control logic unit 22 is adapted both to interpret a TX Active signal 31 in order to detect interference and to interpret a sudden change in the duty cycle of the highest magnitude bit of the ADC 142 in order to detect interference.

The present invention can be used in any GPS system but is particularly advantageous when used in an embodiment shown in FIG. 4, where the GPS system 1 and the RF transmitter 3 are parts of a mobile device 4, such as a cellular phone or a personal digital assistant, or even a mobile computer, such as a lap top.

The present invention is specifically advantageous in applications where the RF transmitter is a GSM transmitter, which often is the situation with many mobile devices of today.

By feeding zeros to the correlation unit 16 during interference, the disturbance will be minimized. There exists a threshold when the disturbances have a higher impact on the correlation than introducing zeros. Thus, if it is known when the disturbances are high enough, it is possible to minimize the performance degradation.

According to the invention, the maximum Signal to Noise Ratio (SNR) after the correlation is maximum degraded by the same factor as the TX Active duty cycle. This means that a 50% duty cycle will degrade the SNR by 3 dB. However, measurements show that the degradation can be much worse than that if the TX Active is high enough.

Figure 6:
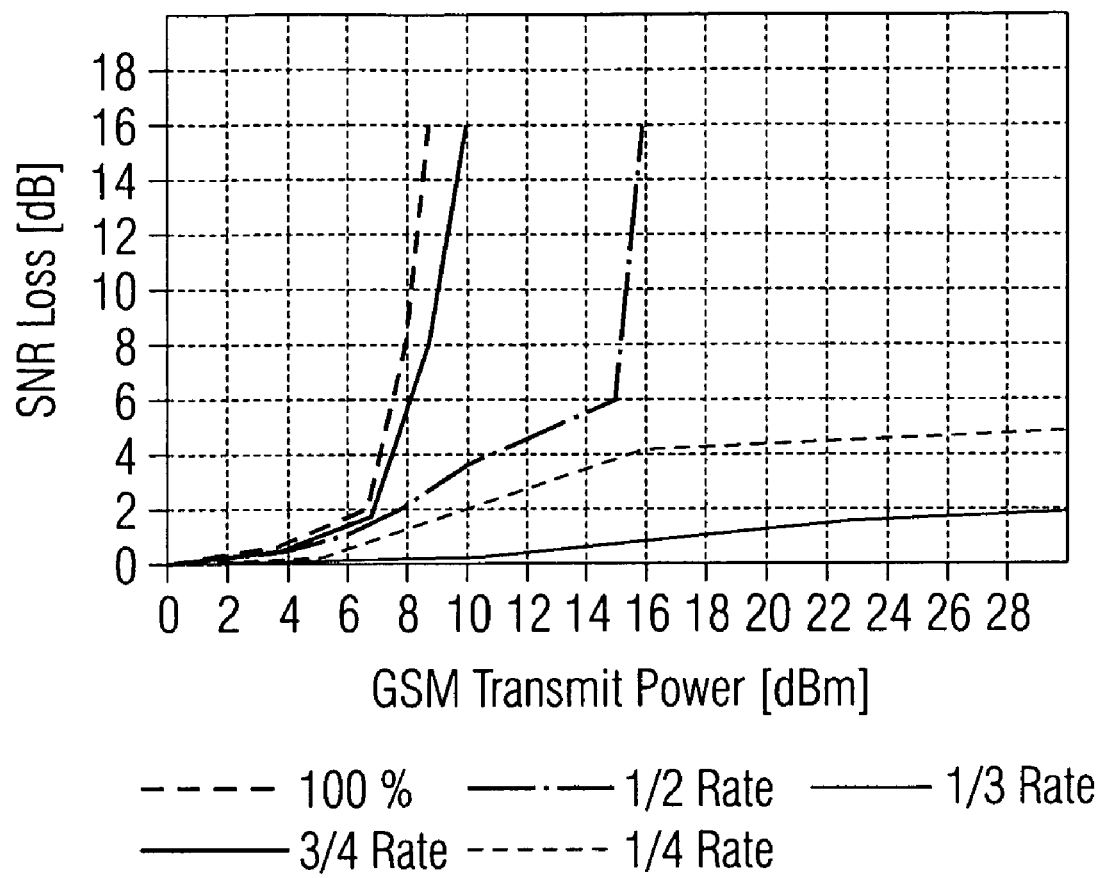
FIG. 6 is a graph showing the measured degradation of SNR vs GSM TX power for different duty cycles.

FIG. 5 depicts the maximum degradation of SNR vs duty cycle of the interferer with the invention, and FIG. 6 shows a situation where a GSM transmitter is the source of interference, the graph showing the measured degradation of SNR vs GSM TX power for different duty cycles.

With reference to FIG. 1, a method for managing interference from disturbing signals in a GPS system 1 according to the present invention will now be described. The GPS system 1 includes an antenna 11, an RF front end unit 12, a filtering unit 13, amplifying circuits 14, a carrier recovery unit 15, a correlation unit 16, and a calculating unit 17 that performs range calculations.

The signal from the carrier recovery unit 15 to the correlation unit 16 is multiplied with zeros, "0", if interference is detected and with ones, "1", if no interference is detected.

In a situation where the amplifying circuits 14 include a Programmable Gain Amplifier (PGA) 141 configured to amplify received signal from the filtering unit 13, an Analog to Digital Converter (ADC) 142 configured to convert the amplified analog signal into a digital signal, and an Automatic Gain Control (AGC) 143 configured to control the gain of the PGA 141 according to the output from the ADC 142, a sudden and significant change in the duty cycle of the highest magnitude bit of the ADC 142 is interpreted as a detected interference, where after a return to the duty cycle prior to the change of the highest magnitude bit is interpreted as no detected interference.

As noted above, FIG. 2 depicts an embodiment where the system 1 is a part of, or co-acting with, an RF transmitter 3, and where a transmit active (TX Active) signal 31, indicating when the transmitter 3 is active, is available from the transmitter 3 to the GPS system 1. The TX Active signal 31 is interpreted as a detected interference and no TX Active signal 31 is interpreted as no detected interference.

A multiplying unit 21, positioned between the carrier recovery 15 unit and the correlation unit 16, performs the multiplications, a control logic unit 22 controls the multiplying unit 21 into using zeros, "0", or ones, "1", and the control logic unit 22 detects the interference.

The invention may be implemented as hardware, but nothing prevents the invention from being implemented as software. Hence the present invention also relates to a computer program product 5 for interference management, schematically illustrated in FIG. 1, including computer program code 51, which, when executed by a computer unit 6, will cause the computer unit 6 to manage interference in a GPS system 1 in accordance with the invention.

The present invention also relates to a computer program product 7 for interference management, schematically illustrated in FIG. 2, that includes computer program code 71, which, when executed by a computer unit 6, will cause the computer unit 6 to act as an inventive multiplying unit 21 and/or a control logic unit 22.

Figure 7:
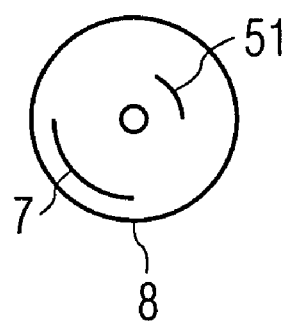
FIG. 7 is a schematic of a computer program code and a computer readable medium in accordance with the present invention.

The present invention also relates to a computer readable medium 8 that stores computer program code 51, 71 as shown in FIG. 7, where the computer readable medium is illustrated as a compact disc. However, it is to be understood that the computer program code 51, 71 may be stored upon any computer readable medium.

While the invention has been described in detail and with reference to specific embodiments thereof, it will be apparent to one skilled in the art that various changes and modifications can be made therein without departing from the spirit and scope thereof. Accordingly, it is intended that the present invention covers the modifications and variations of this invention provided they come within the scope of the appended claims and their equivalents.

What is claimed is:

1. A GPS system configured to manage interference from disturbing signals, comprising:
   an antenna;
   an RF front end unit;
   a filtering unit;
   amplifying circuits comprising a Programmable Gain Amplifier configured to amplify a signal received from the filtering unit, an Analog to Digital Converter configured to convert the amplified analog signal into a digital signal, and an Automatic Gain Controller configured to control the gain of the Programmable Gain Amplifier according to the output from the Analog to Digital Converter;
   a carrier recovery unit;
   a correlation unit;
   a calculating unit that performs range calculations;
   a multiplying unit positioned between the carrier recovery unit and the correlation unit, wherein the multiplying unit is configured to multiply a signal from the carrier recovery unit to the correlation unit with either zeros, "0", or ones, "1"; and
   a control logic unit configured to control the multiplying unit to using zeros, "0", when an interference is detected and into using ones, "1", when no interference is detected, wherein the control logic unit is further configured to measure a duty cycle of the highest magnitude bit of the Analog to Digital Converter and to interpret a change in the duty cycle of the highest magnitude bit as a detected interference when the highest magnitude bit is at or above a predetermined level, and the control logic unit is configured to interpret no detected interference when the measured duty cycle of the highest magnitude bit is below the predetermined level.

2. The GPS system of claim 1, wherein the system is configured to connect with an RF transmitter so as to facilitate the transmission of a transmit active signal from the transmitter to the GPS system, the transmit active signal indicating when the RF transmitter is active, and the control logic unit is further configured to interpret the transmit active signal as a detected interference and to interpret no transmit active signal as no detected interference.

3. The GPS system of claim 2, wherein the GPS system and the RF transmitter are connected as parts of a mobile device.

4. The GPS system of claim 3, wherein the mobile device is a cellular phone.

5. The GPS system of claim 3, wherein the mobile device is a personal digital assistant device.

6. The GPS system of claim 3, wherein the mobile device is a laptop computer.

7. The GPS system of claim 2, wherein the RF transmitter is a GSM transmitter.

8. A method for managing interference from disturbing signals in a GPS system, the method comprising:
   providing a GPS system comprising an antenna, an RF front end unit, a filtering unit, amplifying circuits comprising a Programmable Gain Amplifier configured to amplify a signal received from the filtering unit, an Analog to Digital Convener configured to convert the amplified analog signal into a digital signal, and an Automatic Gain Controller configured to control the gain of the Programmable Gain Amplifier according to the output from the Analog to Digital Converter, a carrier recovery unit, a correlation unit, and a calculating unit that performs range calculations; and
   providing a signal from the carrier recovery unit to the correlation unit, wherein the signal is multiplied with zeros, "0", when an interference is detected and with ones, "1", when no interference is detected;
   wherein a change in a duty cycle of the highest magnitude bit of the Analog to Digital Converter is interpreted as a detected interference when the highest magnitude bit is at or above a predetermined level such that the signal provided from the carrier recovery unit to the correlation unit is multiplied with zeros, "0", and the duty cycle of the highest magnitude bit is interpreted as no detected interference when the highest magnitude bit in the duty cycle is below the predetermined level such that the signal provided from the carrier recovery unit to the correlation unit is multiplied with ones, "1".

9. The method of claim 8, wherein the GPS system is connected with an RF transmitter, and the method further comprises:
   when the RF transmitter is active, transmitting an active signal from the transmitter to the GPS system, wherein the transmit active signal being sent is interpreted as a detected interference and no transmit active signal being sent is interpreted as no detected interference.

10. The method of claim 8, wherein the GPS system further comprises a multiplying unit positioned between the carrier recovery unit and the correlation unit, the multiplying unit performing the multiplications of the signal, and a control logic unit that detects the interference and controls the multiplying unit into using zeros, "0", or ones, "1", based upon the interference detection.

11. A computer program product for managing interference in a GPS system, the GPS system comprising an antenna, an RF front end unit, a filtering unit, amplifying circuits comprising a Programmable Gain Amplifier configured to amplify a signal received from the filtering unit, an Analog to Digital Converter configured to convert the amplified analog signal into a digital signal, and an Automatic Gain Controller configured to control the gain of the Programmable Gain Amplifier according to the output from the Analog to Digital Converter, a carrier recovery unit, a correlation unit, and a calculating unit that performs range calculations, the computer program product comprising a computer program code that, upon execution by a computer unit, causes the computer unit to manage interference in the GPS system by providing a signal from the carrier recovery unit to the correlation unit, wherein the signal is multiplied with zeros, "0", if an interference is detected and with ones, "1", if no interference is detected;

wherein the computer program product is configured to interpret a change in a duty cycle of the highest magnitude bit of the Analog to Digital Converter as a detected interference when the highest magnitude bit is at or above a predetermined level such that the signal provided from the carrier recovery unit to the correlation unit is multiplied with zeros, "0", and the computer program product is further configured to interpret no detected interference when the duty cycle of the highest magnitude bit is below the predetermined level such that the signal provided from the carrier recovery unit to the correlation unit is multiplied with ones, "1".

* * * * *